United States Patent [19]
Honey

[11] Patent Number: 5,464,371
[45] Date of Patent: Nov. 7, 1995

[54] FEEDER ADAPTER FOR MOUNTING A COMBINE HEADER TO A FEEDER HOUSING OF A COMBINE

[75] Inventor: Gregory J. Honey, Bracken, Canada

[73] Assignee: Honey Bee Manufacturing Ltd., Frontier, Canada

[21] Appl. No.: 239,967

[22] Filed: May 9, 1994

[30]     Foreign Application Priority Data

Dec. 6, 1993 [CA] Canada .................................. 2110775

[51] Int. Cl.$^6$ ..................................................... A01F 12/10
[52] U.S. Cl. ................... 460/20; 460/70; 56/189
[58] Field of Search .................... 460/20, 16, 70; 56/119, 189

[56]         References Cited

U.S. PATENT DOCUMENTS

| | | | |
|---|---|---|---|
| 1,222,730 | 4/1917 | Bunting . | |
| 1,667,391 | 4/1928 | Raney et al. . | |
| 2,464,919 | 3/1949 | Carroll | 56/158 |
| 2,671,553 | 3/1954 | Herndon | 198/166 |
| 2,800,217 | 7/1957 | West | 198/104 |
| 4,739,774 | 4/1988 | Heidjann | 460/16 |
| 4,901,510 | 2/1990 | McClure et al. | 56/119 X |
| 4,956,966 | 9/1990 | Patterson | 56/181 |
| 5,005,343 | 4/1991 | Patterson | 56/144 |
| 5,056,303 | 10/1991 | Lawrence | 460/16 X |
| 5,090,187 | 2/1992 | Mews | 56/119 |

FOREIGN PATENT DOCUMENTS

| | | |
|---|---|---|
| 426128 | 3/1945 | Canada . |
| 530191 | 9/1956 | Canada . |
| 1267292 | 4/1990 | Canada . |
| 1322104 | 9/1993 | Canada . |

*Primary Examiner*—Terry Lee Melius
*Attorney, Agent, or Firm*—Kerkam, Stowell, Kondracki & Clarke; John C. Kerins

[57]         ABSTRACT

A feeder adapter for mounting a header on a feeder housing of a combine, the feeder adapter having a housing with an inlet positionable immediately behind a rear feed draper of the header and an outlet which is of a size and shape to match with a forward facing inlet of the feeder housing. The housing of the feeder adapter contains a feeder drum of the retractable finger type mounted for rotation on a transverse axis above a floor surface of the housing so as to engage the cut crop delivered to the rear end of the rearward feed draper and propel it into the outlet opening and thus into the inlet of the feeder housing. The feeder adapter has a subframe for attaching the feeder adapter to the feeder housing and attachment members for suspending the header from the subframe.

11 Claims, 4 Drawing Sheets

FEEDER ADAPTER FOR MOUNTING A COMBINE HEADER TO A FEEDER HOUSING OF A COMBINE

BACKGROUND OF THE INVENTION

1. Field of the Invention

This invention relates to a feeder adapter, and more particularly to an adapter which is utilized in combination with a header for mounting the header on a feeder housing of a combine and for transferring cut crop from the header into the feeder housing.

2. Description of the Prior Art

Conventional combine units contain a prime mover for driving a combine which carries a header adapted to feed crop into the combine while simultaneously threshing the grain from the crop. The combine includes a feeder housing mounted at the front, the feeder housing having a generally forward facing inlet opening and a mounting structure about the opening to which the header is attached. The feeder housing of present day combines is mounted for pivotal movement about a transverse horizontal axis at an upper end thereof, and hydraulic powered cylinders are provided for pivoting the lower end of the feeder housing forwardly and upwardly so as to raise the header which is attached to it. The header may be of a type for picking up swathed crops or it may include a sickle bar for cutting the crop and transferring it directly to the inlet opening of the combine.

The different makes of combines from various manufacturers, as well as different sizes and models of combines of the same manufacturer, have feeder housings with different sizes and shapes of inlet openings as well as different types of attachment arrangements for connecting the header to the combine. Manufacturers, including manufacturers other than those which produce the combines, have developed types of headers for use on different makes of combines having various features which are desirable to combine owners.

As Canadian Patent No. 426,128, T. Carroll, granted Mar. 13, 1945, shows some makes of combine headers have used for considerable time in the past an auger type system for delivering cut crop from behind the sickle bar to an opening in the rear panel of the header for feeding into the inlet opening of the feeder housing of the combine. Other designs effectively utilize draper systems, which usually include two long transversely extending main drapers for feeding the cut crop in directions from opposite ends of the header to a short central rearward feeding draper, such as shown in U.S. Pat. No. 2,671,553, H. Herndon, granted Mar. 9, 1954. The rearward feeding draper has been conventionally disposed to move the crop, which is delivered to it from the two transverse drapers, and also directly from the sickle bar in front of it, through an opening in the rear panel of the header and thus into the inlet of the combine feeder housing. As it was found that the rearward feed draper was not on its own capable of feeding and controlling the volume of crop delivered to it, particularly for headers of considerable width, there are headers in use which are provided with feeder apparatus including means with an additional rotating member having fingers or paddle members and being mounted above the rear end of the rearwardly feeding draper. Such an arrangement was used, for example, in a combine header sold in the early 1980's under the trademark CROP HAWK. Another example is shown in the above identified Herndon patent and also U.S. Pat. Nos. 4,956,966 and 5,005,343, both of Roger L. Patterson, granted Apr. 9, 1991 to MacDon Industries Ltd. Such additional feed mechanism confines the crop on the rearward feed draper and assists in feeding the crop into the inlet opening of the feeder housing of the combine.

The draper type headers had been utilized extensively in swather headers, but were found to have a number of disadvantages when utilized in combine headers. Wide headers are, of course, desirable to enable efficient and quick harvesting of grain, and even with the provision of the additional feeder assembly member above the rear end of the rearwardly feeder draper, such a design has not been found capable of handling heavy crops without buildups and jamming in front of the inlet to the feeder housing. It is known that because of the nature of the chain type conveyer in the feed housing of conventional combines, the crop has to be fed forcibly into the inlet of the combine feeder housing for the conveyer in the feeder housing to quickly carry it upwardly away from the inlet. In an attempt to quickly feed the crop to the inlet opening, it has been customary to drive the rearward feed draper at relatively high speeds. This has not fully overcome, however, the jamming problem. Moreover, particularly when the crop is of the bushy type, such as peas and beans, the existence of the additional feeder member in front of the rear panel of the header actually hinders the flow of the cut crop and causes the crop to hang-up, this in turn usually resulting in a complete jamming at the feeder housing inlet.

Moreover, in order that the header can be used in conjunction with a number of different combines, the header must be supplied with appropriate connection means for the feeder housing of any specific combine, and because the inlet openings of different combines have different widths, headers must be designed for each width, requiring significant design differences with respect to the width of rearward feed drapers, as well as the spacings between the inner ends of the transverse drapers and possibly in relation to the additional feeder assembly above the rear end of the rearwardly feed draper.

SUMMARY OF THE INVENTION

It is an object of the present invention to provide a feed adapter which avoids the above problems of feeding cut crop into the feeder housing of a combine and also to make it possible to simplify the design of headers for mounting on various makes and sizes of combines.

According to the present invention, there is provided a feeder adapter including a housing having a forward facing crop inlet and a rearwardly facing crop outlet, the crop outlet being defined by a frame structure for readily attaching the feeder adapter to the combine feeder and matching the outlet of the feeder adapter to the inlet opening of the combine feeder housing. The frame structure has attachment means for connecting support between the frame structure and the header for suspending the header therefrom and to position the forward facing crop inlet of the feeder adapter behind the rear delivery end of the rearward feed draper means of the header. The feeder adapter housing defines an internal feed chamber between and in communication with the inlet and outlet of the feeder adapter housing, and a driven crop feeder means is disposed in the chamber and has crop engaging means for contacting the cut crop arriving at the inlet of the feeder adapter and driving it thereunder to the feeder housing outlet and thus into the inlet opening of the combine feeder housing.

BRIEF DESCRIPTION OF THE DRAWINGS

In the accompanying drawings, an embodiment of the invention is shown, as an example, where.

DESCRIPTION OF THE PREFERRED EMBODIMENT

Figure 1:
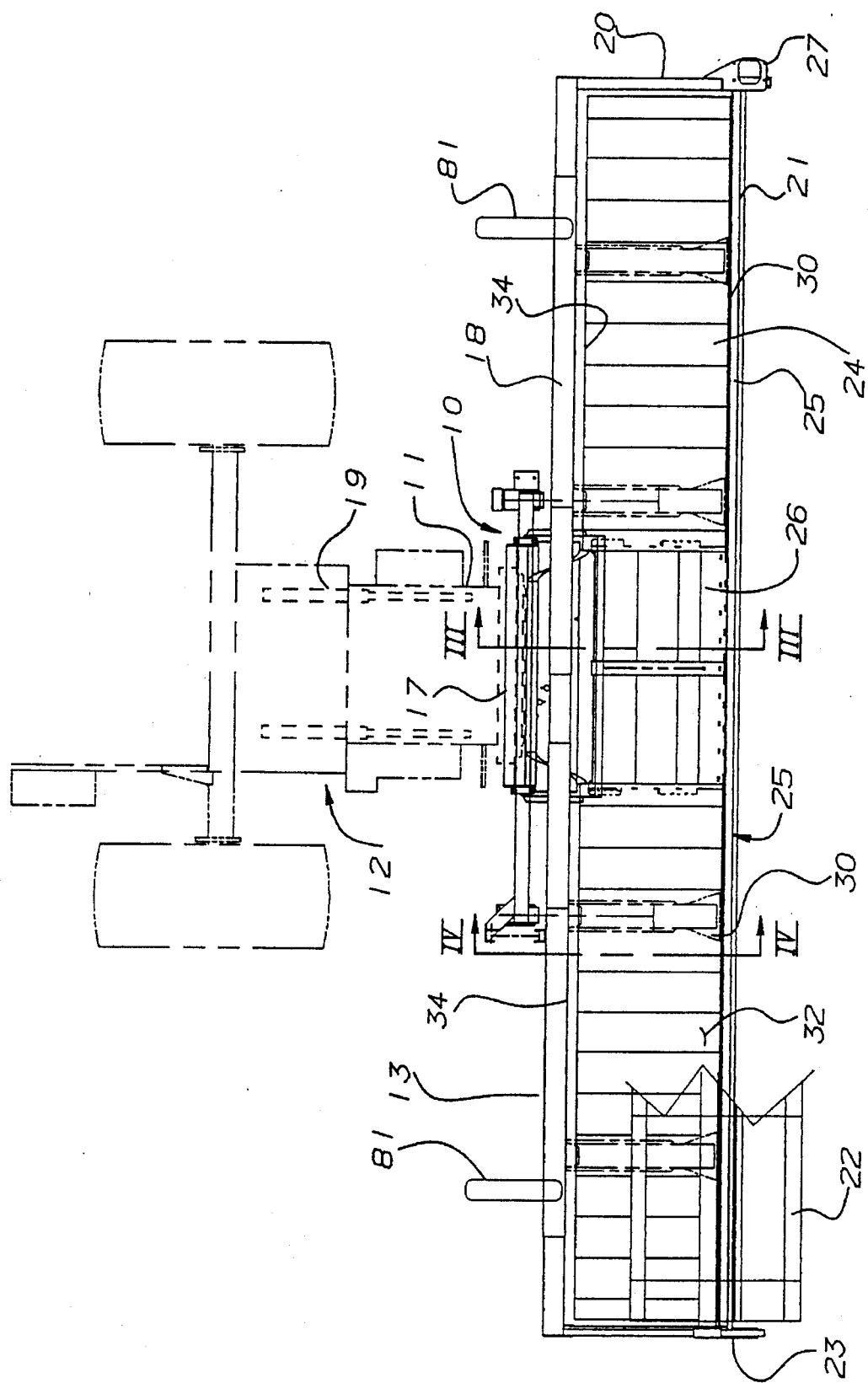
FIG. 1 is a plan view showing the feeder adapter of the present invention mounted on the front of a combine and supporting a combine header.

In the drawing the reference character 10 generally denotes the feeder adapter which is affixed to the front of a feeder housing 11 on a combine 12, the feeder adapter 10 supporting a combine header 13 at the front thereof. The feeder housing 11 is conventionally mounted on the front of the combine and internally contains a chain type conveyer 14 having a lower end turning about a lower sprocket shaft 15. The conveyer is provided with the cut crop which is fed from the header through a forwardly facing inlet opening 16 of the feeder housing to carry into the combine. The feeder housing 11 is mounted for pivotal mount about an upper transverse axis, and hydraulic cylinders 19, are provided for moving the feeder housing about the transverse axis. On expansion of the cylinders 19, which are controlled from the cab of the combine, the lower end of the feeder housing 11 swings upwardly about the upper transverse axis so that the feeder adapter 10 and the header 13 which are carried thereby are raised. The inlet opening 16 of the feeder housing varies in shape and size, depending on the make and size of the combine. The periphery of the opening 16 is defined by a frame structure 17, again which varies in character from combine to combine, and is designed to have mounted thereon an attachment structure of the header.

The header 13 includes a main frame member 18, which extends transversely the full width of the header, and at opposite ends there are provided downwardly and forwardly sloping support members 20 which are connected to a sickle bar 21. The sickle bar 21 extends entirely across the front of the header 13 and is provided with a drive means, preferably in the form of a hydrostatic motor 27 for reciprocating the knife thereof for cutting the crops as the header is moved forwardly into a standing crop by the combine. A reel 22 which is rotated by a separate hydrostatic motor is mounted between arms 23 which are pivotally connected at the rear ends thereof to the frame member of the header. Hydraulic cylinders are provided for raising and lowering the arms 23, the cylinder action again being controllable from the cab so as to allow adjustment of the height of reel above the sickle bar 21 and deck 24 from the cab of the combine. Rotation of the reel 22 assists in directing the crop cut by the sickle bar back onto the deck 24. The deck 24 is defined by the upper surfaces of the main transverse draper means 25 and a central rearward feed draper means 26. The main transverse draper means 25 consists of a pair of separate draper assemblies 30, 30, each of which includes a continuous belt 31 having an upper surface 32 extending between outer end rollers and inner end rollers 33 and adapted to carry the cut crop, which is pushed by the reel onto its upper surface 32 from the sickle bar, to the central rearward feed draper means 26. Either the outer end roller or the inner end roller of each continuous belt 31 is driven by a separate hydrostatic motor (not shown) for driving the continuous belt 31 in a direction to cause the upper surface 32 to travel in a direction from the outer end of the header towards the area of the central rearward feed draper means 26.

Figure 2:
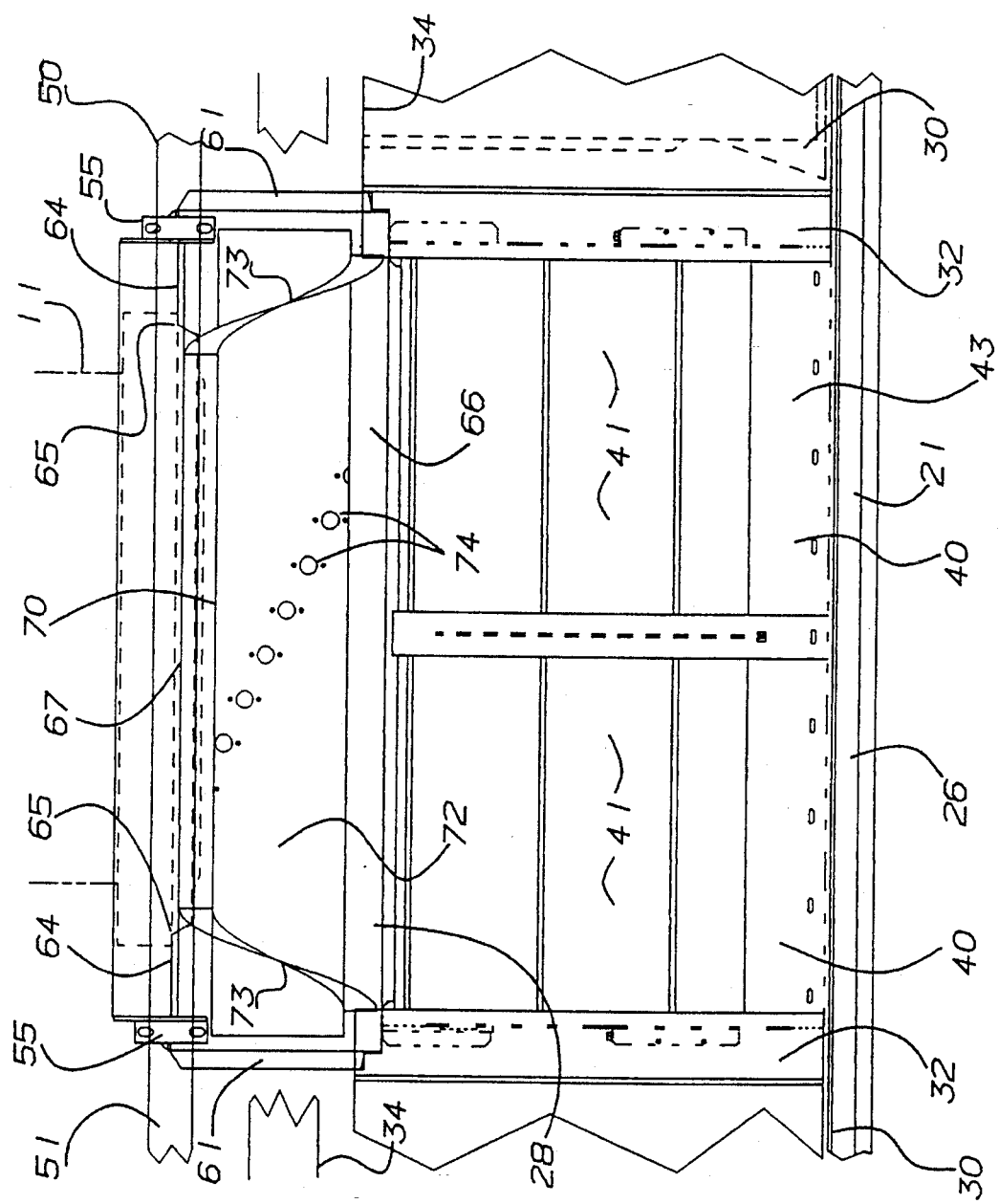
FIG. 2 is an enlarged plan view of a central portion of FIG. 1, showing the feeder adapter in more detail.

Along the rear edge of each separate draper assembly 30 is a substantially vertical rear panel 34, the pair of rear panels defining the back of the deck. The pair of panels 34 terminate at each side of the central area occupied by the rearward feed draper means 26, thus defining an outlet opening 28 at the back of the header deck behind the rearward feed draper means 26. As best seen in FIG. 2, the central rearward feed draper means 26 includes a pair of closely spaced short, parallel drapers 40, each consisting of a continuous belt 41 providing an upper surface 42, which during operation travels in a rearward direction, i.e. away from the sickle bar and towards the outlet opening provided between the inner ends of the rear panels 34. At the bottom of the most forward end of the rearward feed draper means 26 is a deck plate 43 which is affixed to the rear of the sickle bar 21 and extends rearwardly a short distance under the forward ends of drapers 40. The deck plate 43 closes the area between the rearward feed draper means 26 and the rear of the sickle bar 21 so that the cut crop landing in this area from either of the main transverse draper assemblies 30 or from the sickle bar 21 in front of the central rearward draper bar 26 does not fall through the header deck and is picked up as well for transporting by the central rearward feed draper means 26. The drapers 40 include forward rollers 44 and rearward rollers 45 about which the belts travel, one of these rollers being driven by a hydrostatic motor and thus providing a drive roller for its respective belt. The rollers 44 and 45 are mounted for rotation in a central draper framework 46, which may be affixed to the deck plate 42 at its forward end. The framework projects to a rearward end thereof which is located immediately in front of the feeder adapter 10.

The feeder adapter 10 includes a subframe 50 including an upper transverse member 51 and a lower transverse member 52 which are of substantially the same length and are longer than the width of the combine feeder housing. At the outer ends of the transverse members 51 and 52 are joined by vertical frame members 53, thus defining therebetween a central open area of the subframe 50. The transverse members of the subframe 50 carry latching members 54 which are combine specific in that they are designed to cooperate with the frame structure 17 at the periphery of the combine inlet opening in the feeder housing for rigidly affixing the subframe to the feeder housing 11.

The feeder adapter, which is attached to the subframe 50 by way of a pair of vertical support members 55 which are fixed between the upper and lower transverse members 51 and 52, includes a housing 60 which includes a pair of spaced side panels 61,61 and a bottom panel 62 which has a rear edge 63 defining the bottom of a rear outlet of the feeder adapter housing, the rear edge 63 being positioned to be generally adjacent the bottom of the inlet opening of the combine feed housing. The side panels 61,61 are spaced a set distance which is greater than the inlet openings of the various combines with which the feeder adapter 10 is to be used. The feeder housing has, however, a pair of vertical rear panels 64,64 which are selected for the particular combine for which the feeder adapter is designed, the panels having a height substantially equal to the height of the feed housing inlet and having sufficient width so that the opposed inner edges 65,65 of the panels 64,64 define therebetween an outlet opening 67 of the feeder housing with a width which matches the width of the inlet opening of the feeder housing 11 of the combine. As shown, the most forward end of the bottom panel 62 terminates at the opening defined between opposed inner ends of the rear panels 34, 34 of the header. The bottom panel 62 slopes upwardly from its forwardmost part to the rear edge 63, thus providing a floor surface 66 which extends between the side planes, and defines therewith an interior chamber which is between a forward facing opening providing a feeder adapter inlet 28 and a rear feeder adapter outlet 67, the latter being designed to match the feeder house inlet of the combine. The inlet opening of the feeder adapter is located at the rear end of the rearward feed draper means 26.

Mounted in the feeder adapter is a driven feed means 70 mounted for rotation in bearings carried by the side panels 61,61 of the feeder adapter housing. The feed means 70 may be driven by a separate hydrostatic motor or by way of a drive connection with the shaft 15 of the feeder housing of the combine. The feed means 70 is rotated so as to engage the cut crop delivered rearwardly by the drapers 40 and to propel it from the inlet opening 28 at the front of the feeder adapter towards the rear outlet opening in a manner to forcibly push the cut crop well into the combine feeder housing 11 through the aligned outlet opening 67 of the feeder adapter 10 and the inlet opening 16 of the combine feeder housing 11.

Figure 3:
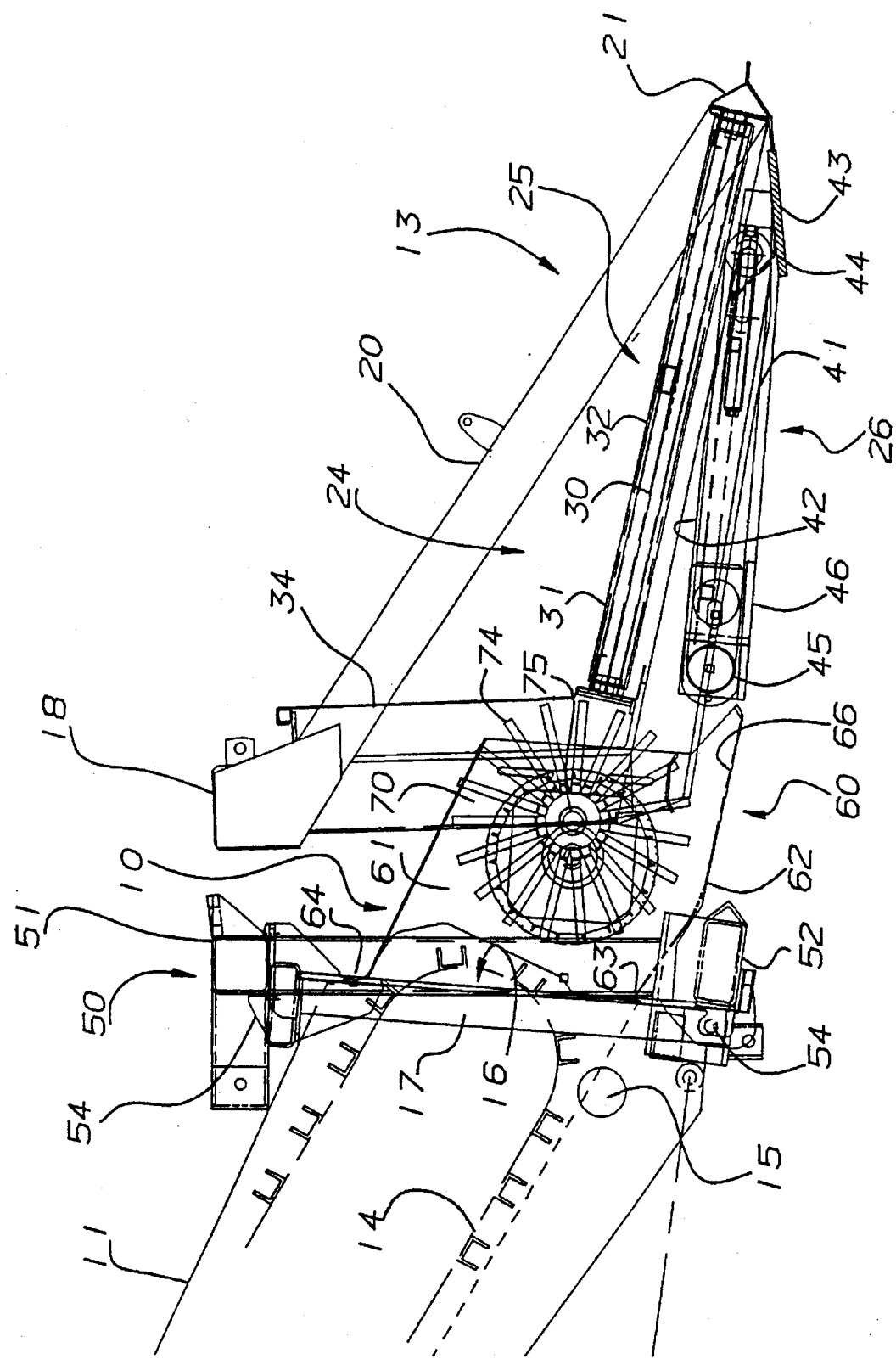
FIG. 3 is a cross sectional view as seen from the line III—III of FIG. 1 and showing the relationship of the rearward feed draper of the header to the feeder adapter housing and crop feeder means in the feeder adapter, and FIG. IV is a cross sectional view as seen from the line IV—IV of FIG. 1 and showing the mounting structure for the header.

The driven feeder means 70 is in the form of a drum member 72 which extends the full width of the feeder housing and is driven in clockwise direction, as viewed in FIG. 3. The axis of rotation of the drum member, of course, extends in a transverse direction within the interior chamber of the housing of the feeder adapter. Mounted on opposite ends of the exterior of the drum are short lengths of spiral auger flights 73. The length of these flights will depend on the width of the rear panels 64,64 which are in turn selected to provide the outlet opening of the feeder adapter for a particular feeder housing structure of a combine. The drum member 72 is provided with retractable fingers 74, which project from the exterior surface of the drum member in a spiral pattern about the drum member. The inner ends of the fingers 74 are journaled on a stationary shaft 75 which is in the form of a crank shaft, the axis of the portion of shaft 75 is eccentric in relation to the axis of rotation of the drum so that on rotation of the drum the fingers each of which projects through an opening in the drum turn on the shaft 75, and thus, the fingers in an axial direction move relative to the exterior surface of the drum from a fully extended position to a retracted position in which they do not project from the drum surface. As the axis of the shaft 75 is forward of the axis of rotation of the drum, the fingers move to the most extended position as the fingers move downwardly in front of the drum towards the floor surface 66 of the internal chamber of the feeder adapter, but as the fingers approach the floor surface, they have commenced to retract relative to the floor surface 66 and continue to do so as the fingers pass over the floor surface. By the time the fingers approach the rear outlet opening of the feeder adapter, they are effectively fully retracted in relation to the drum surface, i.e., they do not project from the drum surface, and do not start to again project until they are departing the area in front of the rear outlet opening. As the fingers 74 are fully extended as they pass downwardly through the area behind the rear end of the rearward feed draper means 26, they are thrust fully into the cut crop being delivered thereto, and thus are very effective in engaging and propelling the cut crop as it moves between the lower surface of the drum member and the floor surface 66 in the interior chamber. Also, as the fingers become fully retracted from the cut crop which has then been accelerated towards the rear outlet opening, the fingers are not present as they pass upwardly past the rear outlet opening 67 to impede the movement of the cut crop through the outlet opening and into the inlet opening 16 of the feeder housing of the combine. As the crank member which forms the shaft 75 is adjustable about 30 about the axis of the drum member, the phases of the projectional extraction can be varied somewhat, but generally the shaft 75 is disposed in front of the axis of the drum member.

Figure 4:
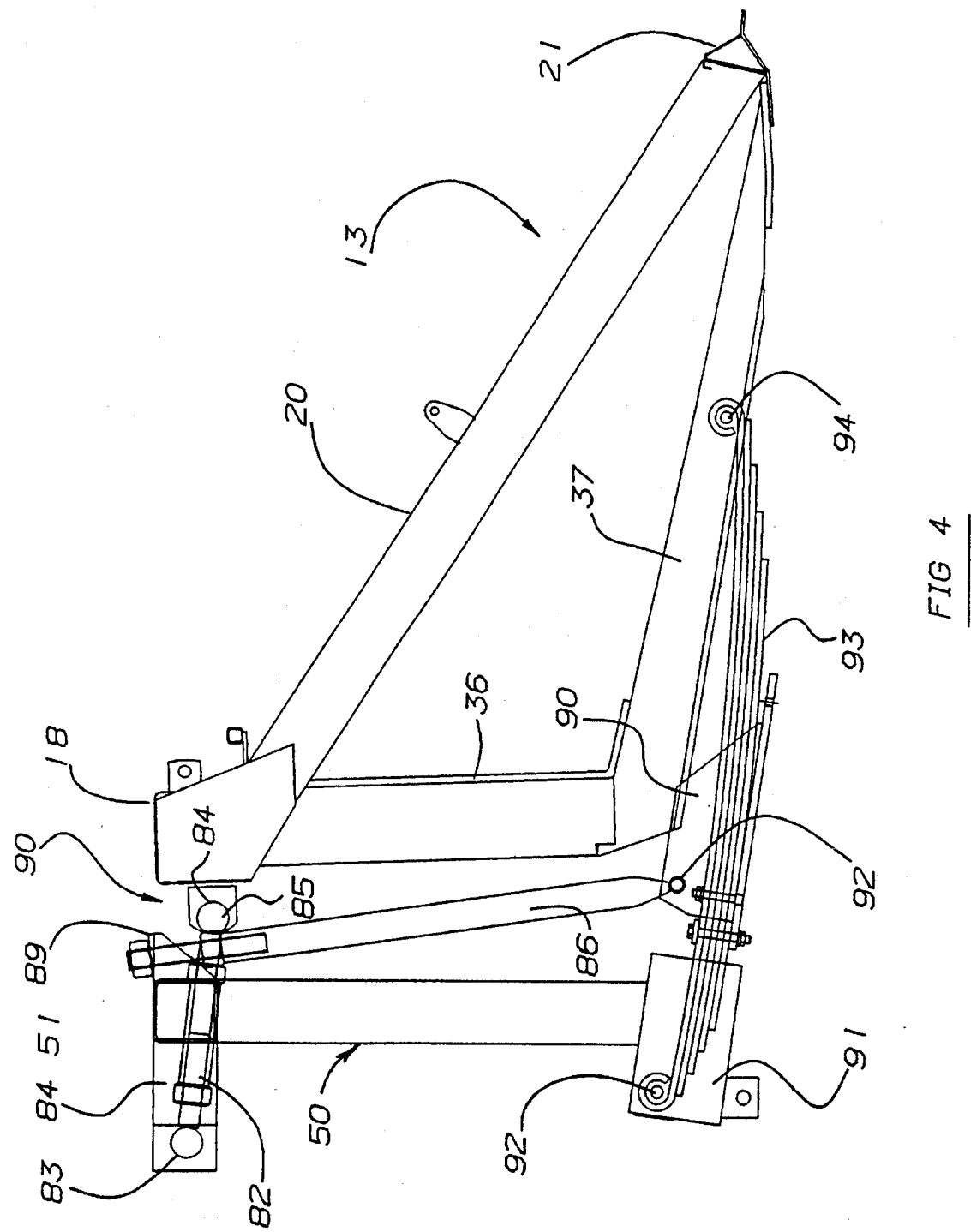

Substantially vertically extending frame members 36 are affixed to the transversely extending main frame member 18 of the header and are connected at their bottom ends to the sickle bar 21 by forwardly extending lower frame members 37. (FIG. 4) Support means 80 suspend the header 13 from the subframe 50. While the header is provided with gauge wheels 81,81 at opposite ends thereof so as to allow the header to follow the contour of the ground (FIG. 1), the central portion of the header is carried by the support means 80, and of course, when the header is fully raised, by actuation of the hydraulic cylinders 19 which control the position of the feeder housing 11, the header is fully suspended from the feeder housing. An upper link 82 is pivotally connected at the rear end to a pin 83 which is fixed relative to the upper transverse members 51 of the subframe 50 by a bracket 84, and at a forward end to a pin 85 fixed relative to the frame member 18 of the header. Another pair of links 86, each of which is substantially vertically disposed, is connected between upper bracket 87 affixed to the opposite ends of upper transverse member 51 of the subframe 50 and a lower bracket 90 by way of pivot pin 95. Connected to the outer ends of the lower transverse member 52 is a pair of brackets 91 each of which has mounted thereon of pivot pin 92. A pair of leaf spring assemblies 93 are connected one each between one of the pivot pins 92 and a pivot pin affixed to one of the lower frame members 36 of the header. The bracket 90 is attached to the leaf spring assembly 93 intermediate its length between pins 91 and 94. The pair of spring assemblies 93 allow the header 13 to have a floating action relative to the subframe 50 of the feeder adapter. Each of the links 82 are of adjustable length so as to enable the adjustment of the header angle, and each of the links 86 are also of adjustable length so as to permit adjustment of the header height.

While the illustrated embodiment includes the leaf spring assemblies 93, these links may in fact be rigid, as it is possible to obtain floating action of the header relative to the combine about a transverse action by way of a nitrogen accumulator connected into the hydraulic system which provides the pressurized fluid for actuation of the cylinders 19 utilized to raise the feeder housing 11. Such accumulators are in fact provided in some combines, and can in any event be readily installed in any combine so that the transverse axis about which the header is allowed to float is in fact the upper transverse axis of pivot of the feeder housing relative to the combine.

The arrangement involving the use of the feeder adapter 10 of the present invention together with the disclosed header 13 provides advantages over known header constructions which are attached directly to the feeder housing 11 of the conventional combines. The provision of the driven feed means 70, and particularly one of the type formed by the rotating drum with the retractable fingers has proven more effective in clearing the cut crop being delivered by the rearward feed draper means 40 to the inlet 28 of the feeder adapter housing. It has been found that the draper speed of this rearward feed means can be considerably lower than that used with the above-described known header design, and yet the feed into the feeder housing is achieved without jamming either in the header or at the inlet to the combine feeder housing. The fact that the area at the rear of the header deck is entirely clear of the additional feeder which has been used over the rear end of the rearward feed draper avoids causing the cut crop, and particularly bushy plants, to hang up and cause a jam-up at this location.

Moreover, by making the feeder adapter combine specific, i.e. adapted to a particular model and make of combine, the header construction per se requires no modification. The type of connecting means required for connection to the feeder housing of the combine is accounted for in the design of the subframe 50 and the type of latching means provided thereon. To accommodate the size and shape of the inlet opening of the feeder housing it is only necessary to vary to size of the rear panels 64,64 and the positioning of the rear edge of the bottom panel 62. Also to accomplish more efficient feed by the drum member 72, the length of the auger flights 73 may be different, depending on the width of the outlet opening between the rear panels 64,64.

Various modifications to the disclosed embodiment of the invention will be obvious to those skilled in the art without departing from the spirit of the invention as defined in the appending claims.

What I claim is:

1. A feeder adapter for mounting a combine header to a feeder housing of a combine for feeding a crop cut by said header into a forwardly facing inlet opening of said feeder housing, said combine being of the type having a frame structure for detachably mounting a header to said feeder housing, said header including a transverse deck having a main draper means and a rearward feed draper means, said main draper means having an upper conveying surface for moving the cut crop transversely in front of a substantially vertical rear panel in a direction from an outer end of the deck to a delivery end at said rearward feed draper means, said rear panel defining an outlet opening, and said rearward feed draper means having an upper conveying surface for delivering cut crop from the delivery end of said main draper means to a rear delivery end positioned at the outlet opening of said rear panel;

said feed adapter including a housing having a forward facing crop inlet and a rearwardly facing crop outlet, said crop outlet being defined by a frame structure for rigidly attaching said feeder adapter to said combine feeder housing and matching said outlet of said feeder adapter to said inlet opening of said feeder housing, said frame structure having attachment means for connection of support means between said frame means and said header for suspending the header therefrom and to position the crop delivery end of said rearward feed draper means immediately in front of said forward facing inlet of said feeder adapter, said feeder adapter housing defining an internal feed chamber disposed between and in communication with said inlet and said outlet of the feeder adapter housing, and a crop feeder means disposed in said chamber having crop engaging means for contacting cut crop at said adapter housing inlet and propelling crop thereunder to said housing outlet.

2. A header structure for attachment to a combine of the type having a feeder housing at the front of the combine and having a forward facing inlet opening at a lower end of the feeder housing defined by a frame structure for mounting a header, said feeder housing being mounted on said combine for pivotal movement about a transverse axis and having power means for raising the lower end of said feeder housing;

said header structure including a header and a feeder adapter;

said header comprising a frame, a front sickle bar extending substantially the width of the header, an upper deck defined by a pair of transverse main drapers separated at inner ends thereof by a central rearward feed draper means, a pair of substantially vertical rear panels at the rear edge of the deck behind said pair of main drapers, said pair of rear panels having opposed inner edges defining a rear outlet opening of said header therebetween, said main drapers having upper crop conveying surfaces for moving crop cut by said sickle bar in a direction from opposite outer ends of said header to delivery ends thereof adjacent opposite side edges of said rearward feed draper means, said rearward feed draper means including a continuous draper belt defining an upper crop supporting surface for delivering cut crop from a forward end disposed behind said sickle bar to a rearward delivery end disposed at said outlet opening at said header;

said feeder adapter comprising a subframe having connector means for attaching said subframe to said frame structure of said feeder housing, support members interconnecting said subframe and said frame of said header for suspending said header from said subframe of said feeder housing, a feeder adapter housing affixed to said subframe and having an internal chamber in communication with a forwardly facing inlet of said feeder adapter and a rear outlet of said feeder adapter, said feeder adapter housing being disposed in said subframe for matching alignment of said feeder housing outlet with the feeder housing inlet opening, said forward facing inlet of said feeder adapter being disposed immediately behind said outlet opening of said header for receiving cut crop from the delivery end of the rearward feed draper belt, and a crop feeder means within said feeder adapter housing for contacting cut crop delivered to said inlet of said feeder adapter and propelling the cut crop through said outlet of said feeder adapter and into said feeder housing.

3. A header structure as defined in claim 2, wherein said housing of said feeder adapter includes a pair of side panels and a bottom panel extending between said side walls and defining an upper floor surface of said chamber of said feeder adapter.

4. A header structure as defined in claim 3, wherein said crop feeder means is rotatably mounted on a transverse axis extending between side panels above said floor surface for rotation on said axis in a direction to propel said cut crop between said crop feeder means and said floor surface.

5. A header structure as defined in claim 4, wherein said side panels are spaced a distance greater than the width of said outlet of said feeder adapter, the width of said outlet being defined by opposed inner edges of a pair of spaced rear panels.

6. A header structure as defined in claim 5, wherein said outlet of said feeder adapter is combine specific, said outlet being defined by a rear edge of said bottom panel together with said inner edges of said rear panels and matching with the side edges and bottom edge of said inlet opening of said feeder housing.

7. A header structure as defined in claim 4, wherein said crop feeder means comprises a rotating drum having a plurality of openings along a central portion of its length and crop engaging fingers projecting through said openings, said fingers being mounted within said drum for movement through a extending phase and a retracting phase each revolution of said drum, said extending phase commencing subsequent to said fingers passing a lower portion of said outlet of said feeder adapter and reaching maximum projection as said fingers pass downward past said inlet of said feeder adapter, said retracting phase resulting in complete retracting of said fingers from the drum surface as said fingers approach a lower edge of said outlet of said feeder adapter.

8. A header structure as defined in claim 5, wherein said crop feeder means comprises a rotating drum having finger openings disposed on a spiral line along a mid portion of the length of an outer surface of said drum, finger means within said drum, and actuating means within said drum for causing said fingers to move to a state of full projection from said outer surface of said drum during rotation of said fingers past said inlet of said feeder adapter and to move to complete withdrawal from a projecting position during rotation of such fingers past said outlet of said feeder adapter.

9. A header structure as defined in claim 8, wherein said drum further comprises a pair of spiral auger flights attached to said surface at opposite ends of said mid portion.

10. A header structure as defined in claim 9, wherein said feeder adapter is combine specific, the spacing of the inner edges of said rear panels being selected to match the width of the inlet opening for a feeder header of a specific combine make, and the length of said spiral auger flights being selected in relation to the width of said rear panels.

11. A header structure as defined in claim 10, wherein said connecter means of said subframe are combine specific for mating with said frame structure of a specific combine make.

* * * * *